Feb. 25, 1941.  J. F. CERNOHOUZ ET AL  2,232,998
TEMPERATURE CONTROL FOR SOLUTIONS
Filed June 27, 1938  2 Sheets-Sheet 1

INVENTORS
James F. Cernohouz
George E. Franck
BY Bair & Freeman
ATTORNEYS

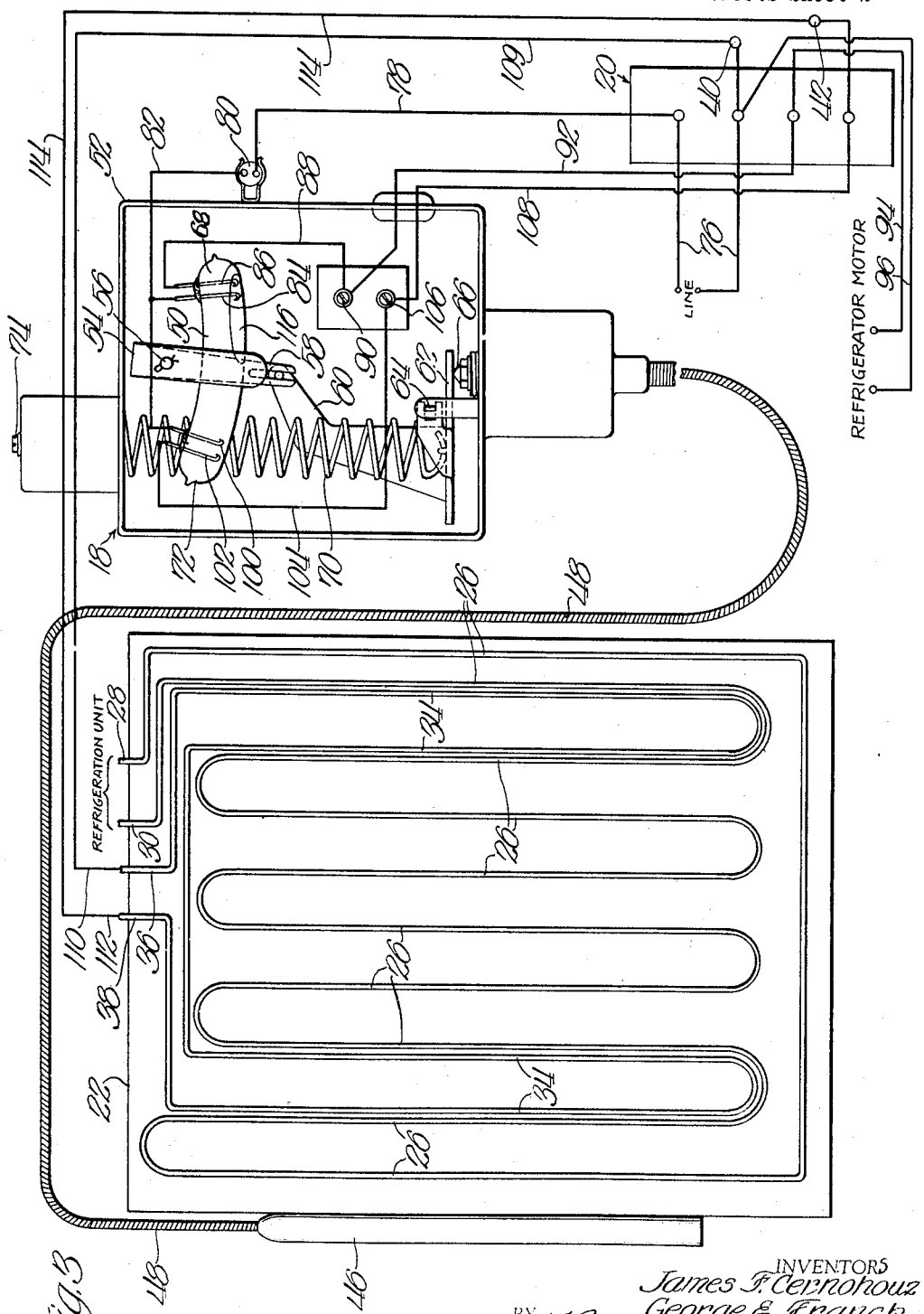

Patented Feb. 25, 1941

2,232,998

UNITED STATES PATENT OFFICE 2,232,998

TEMPERATURE CONTROL FOR SOLUTIONS

James F. Cernohouz and George E. Franck, Chicago, Ill.

Application June 27, 1938, Serial No. 216,102

9 Claims. (Cl. 257—4)

Our invention relates to an apparatus for maintaining selected temperatures in a body of liquid and has particular reference to an apparatus of extremely delicate adjustment which is adapted to either heat or cool a body of liquid to a desired temperature at which it may be held. Among the objects of our invention is the provision of a new and improved temperature control apparatus for maintaining the temperature of a body of liquid at a certain figure wherein the variation on either side may be kept to a minimum.

Another object of our invention is the provision of a new and improved temperature control apparatus which is capable of maintaining an exact temperature in a large body of fluid uniform throughout the entire body so that the temperature may be constant in every portion thereof.

Another object is the provision of a portable temperature control apparatus which can be set up in any convenient location for use with a removable vat containing the liquid subjected to control and which is supplied with a movable structure permitting the insertion and removal of the vat for liquid whenever desired.

Still another object is the provision of a temperature control apparatus for liquids wherein cooling coils and heating coils are located side by side and extend over substantially the entire area of a vat in which the liquid is retained there being provided a thermal responsive element of delicate reaction adapted to cause alternative operation of the heating or cooling coil in response to slight changes in temperature in any part of the body of liquid.

Another object still is the provision of a temperature control apparatus for maintaining a fine temperature adjustment in a body of liquid wherein the cooling coils and heating coils are secured as a unit to a shiftable structure which can be moved or tilted up and down so as to be removed or inserted at will within a vat containing the liquid to be cooled, means being incorporated in the unitary structure for completely shutting off both refrigeration and heating elements when the unitary structure is lifted from the vat of liquid, an added object being also the utilization of the tilting movement when the shiftable structure is immersed so as to agitate the bath to thoroughly circulate the liquid and to move it about when the solution is being used, for example, in developing photographic negatives.

A further object contemplates the provision of a false bottom in a vat for the liquid upon which is mounted both heating and cooling coils and which is perforated so that the liquid may circulate freely in all portions of the vat.

With these and other objects in view the invention consists in the construction arrangement and combination of the various objects of our device whereby the objects contemplated are attained as hereinafter more fully set forth, pointed out in the claims and illustrated in the accompanying drawings in which:

Figure 3 is a diagrammatic representation of the device showing the manner of connecting the refrigeration and heating units to the control device.

Figure 1:
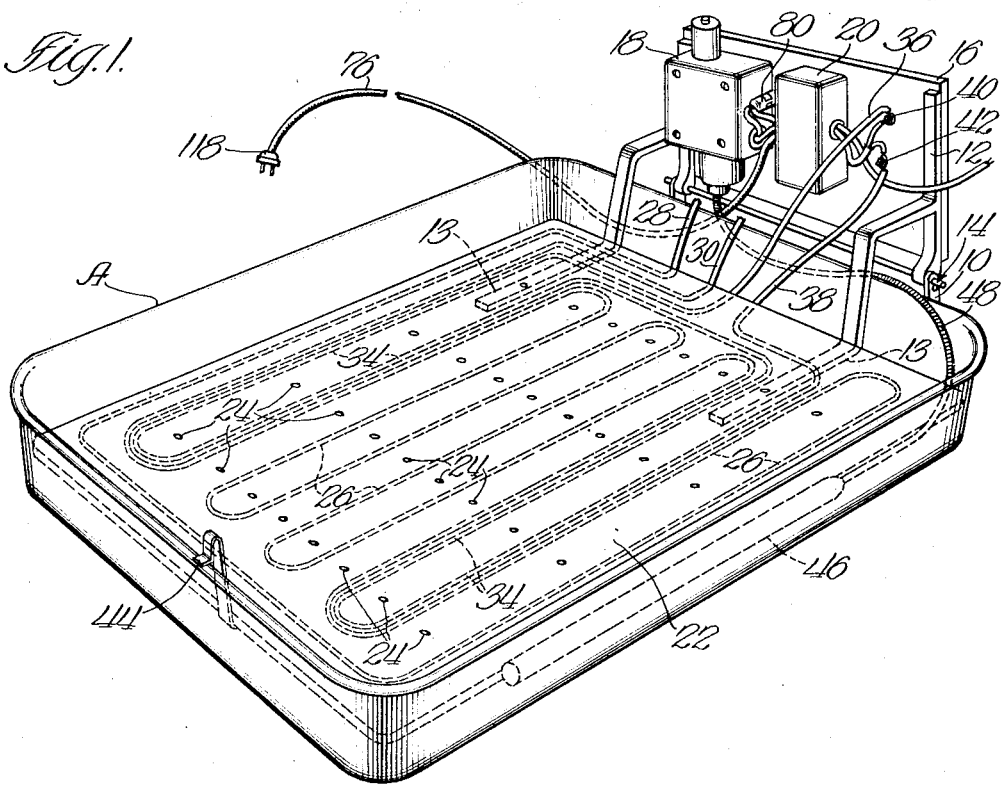
Figure 1 is a perspective view of the apparatus in place in a vat of liquid.

In the use of chemical solutions it is frequently necessary in order to produce certain reactions to maintain a liquid bath of considerable volume at an exact temperature for a considerable length of time. One practical application of this is in the development of photographic negatives wherein the developer solution, especially when used with highly sensitized films, must be kept at a temperature in the neighborhood of 66 degrees Fahrenheit without permitting a variation of more than one half of one degree Fahrenheit above or below the optimum figure of 66° F. In an effort to maintain a 66° temperature it is significant that room conditions might have a considerable effect upon the apparatus. In the winter time for example, the temperature of the work rooms wherein the developing process might take place is apt to lower considerably during the night so that vats of liquid kept therein would become correspondingly cool necessitating a prolonged and careful adjustment in the morning, before beginning work.

On the contrary, summer conditions might readily make the quarters extremely hot and humid tending to cause excessive heating of the liquid in the vats. Furthermore changes in humidity alone cause a variation in evaporation of liquids such as are customarily used which has a marked tendency to change the temperatures. In order then to build an apparatus capable of maintaining a large vat of liquid at an extremely constant temperature under all conditions of operation to which it might be subjected, the device must be one which is extremely sensitive to the slightest changes in temperature conditions and one which would act immediately when necessary to cause a change in temperature in the proper direction. The change moreover must be initially distributed throughout every portion of the body of liquid so that the temperature will be precisely the same in every corner of the vat.

In the embodiment chosen to illustrate our invention there has been selected a small portable apparatus which can be placed upon a work bench or table and suitably connected to a source of electric current and a refrigeration machine of very moderate capacity. The embodiment is adapted for use with a vat A of any convenient area and includes a unitary system of coils B adapted to be positioned in the vat immersed in the liquid and subject to control by a mechanism C mounted adjacent the vat upon an instrument panel. A base D is designed to support not only the vat A but also the instrument panel of the unitary system of coils in such a manner that the latter may be tilted to permit removal of one vat of liquid from this base and insertion of another.

The vat A is one of the more or less customary commercial designs frequently used for the development of photographic negatives and the like. The vat is made quite wide and long so that negatives of any size can be handled but is made rather shallow so that no more liquid than necessary need be used.

The control apparatus as has been previously indicated, consists of the base D which may be wood or metal of a size corresponding to the vat A. The base is of a comparatively light construction so that it can be conveniently placed upon any flat surface which is suited to the purpose in mind. At one end of the base there is a pair of brackets 10 upon which is mounted a pair of especially designed hinges 12 pivoted to the brackets by means of a shaft 14 held in place by cotter pins. An instrument panel 16 is secured to the hinges 12 and serves as a mounting and support for a control device 18 and terminal box 20.

Within the vat is a sheet like structure or frame-work 22 which may be composed of a fibre insulating board cut to a dimension so that it will fit loosely within the vat A forming therein a false bottom when in place. The sheet is secured to extensions 13 of the hinges 12 so that the false bottom or frame-work 22 and the instrument panel 16 may be tilted together with relation to the base D. The false bottom is provided with a series of perforations 24 in addition to being provided with a loose fit so that any liquid in the vat may be absolutely free to circulate under and over the false bottom. This open construction likewise prevents splashing the liquid when the false bottom is lowered initially into place in a full vat of liquid or when it is lifted from a vat similarly full of liquid.

Attached to the under side of the false bottom is a series of refrigeration coils 26 forming an evaporator which is connected at the ends 28 and 30 to a source of refrigeration not shown but which may be the customary small capacity refrigeration machine or any suitable source which may be sufficiently well controlled. Slotted bars 32 are used to hold against the under side of the false bottom.

Secured also to the under side of the false bottom and lying adjacent the refrigeration coils is a series of heating coils 34 which are essentially tubular members containing an electric resistance element and packed with an insulating material so that the heating element is electrically insulated from the coil and body of liquid. The heating coils are connected by means of flexible wires 36 and 38 to suitable binding posts 40 and 42 on the instrument panel.

At the free end of the false bottom there is provided a combined handle bracket and clamp 44 which is suitable for lifting the false bottom from the vat or for shifting it slightly up and down when it is lowered into place to agitate the liquid contents. At the side of the false bottom there is an elongated thermometer bulb 46 connected by a suitable thermometer tube 48 to the control device 18. The thermometer tube it will be noted runs almost the entire length of the vat and is located at a distance from the combined heating coils and refrigeration coils so as to be equally affected by both.

The control device shown in greater detail in Figure 3 employs the well known type of mercury switch embodied in a somewhat banana-shaped tube 50. The tube is pivotally mounted in a casing 52 by means of a bracket 54 pivoted upon a pin 56 which is in turn connected by a link 58 to an arm 60 which rides upon a lever 62. The lever in turn is pivoted at a point 64 and is tilted in one direction by the upward thrust of a piston 66 actuated by liquid within the thermostatic bulb 46. Upward movement of the piston 66 tends to tilt the banana-shaped tube 50 by means of a system of mechanical levers so that an end 68 thereof is moved downward. When the piston 66 is withdrawn during operation of the device a coil spring 70 pulls upward on the opposite side of the lever 62 tending to shift the banana-like tube so that an end 72 is lowered. A screw driver adjustment 74 is provided for setting the instrument for any temperature desired between 0° and +70° F.

A pair of line wires 76 supply electricity to the terminal box 20 and from the terminal box one wire 78 is led through an auxiliary mercury switch 80 through a wire 82 to one terminal 84 of a switch which controls operation of the refrigeration machine. The other terminal 86 of this switch is connected by means of a wire 88 to a binding post 90 and thence through the terminal box by means of wires 92 and 94 to one connection of the refrigeration motor. The other terminal of the refrigeration motor is connected by means of a wire 96 to the opposite line wire 76.

The line wire 82 supplying the refrigerating switch located in the banana-like tube also supplies one terminal 100 of a heating coil switch located at the end 72 of the banana-like tube. The other terminal 102 thereof is connected by means of a wire 104 to a binding post 106 and thence by means of wires 108 and 114 to one end 112 of the heating coil 34. The other end 110 of the heating coil is connected by means of a wire 109 through the terminal box to the opposite side of the line wire 76.

Figure 2:
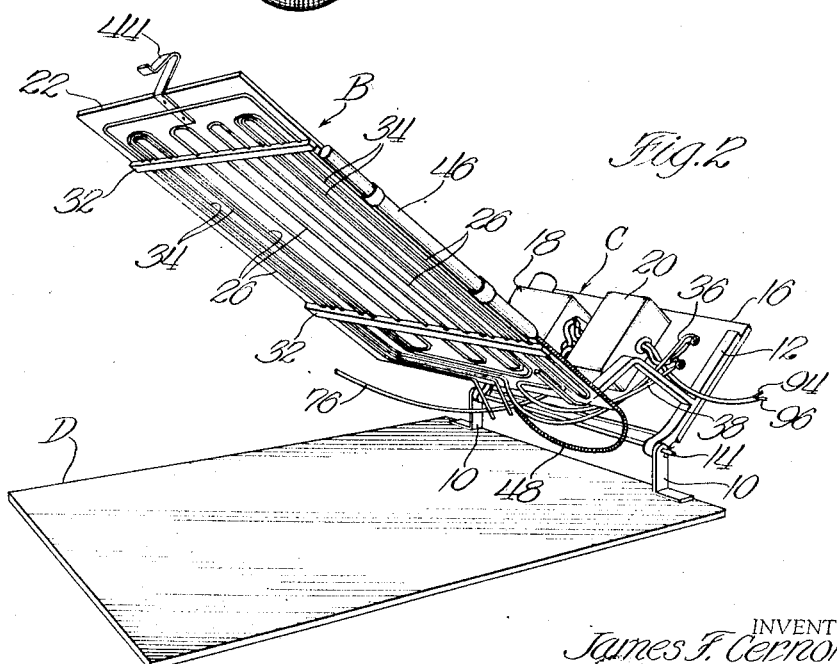
Figure 2 is a perspective view drawn to a slightly smaller scale showing the apparatus in a raised position permitting removal and insertion of a vat of fluid.

Before operation the apparatus in its withdrawn position is tilted upwards in a manner shown in Figure 2. At this time a vat A may be placed upon the base D after which the false bottom 22 accompanied by the coils 26, 34, etc., comprising the unitary structure B may be lowered into place forming a false bottom in the vat with the coils retained underneath. This being accomplished the vat may be filled with a suitable developer or other chemical solution. Upon lowering the unitary structure B the auxiliary line switch 80 is tilted so as to make contact and introduce a line current into the control device 18. If the liquid with which the vat is filled at this time is too warm then the liquid in the thermometer bulb 46 will expand and force the piston 66 upward. Movement of the piston through the lever arrangement previously described has the effect of tilting the banana-like tube 50 in a direction such that the end 68 is lowered. When this occurs a slug of mercury 116 runs to that end of the tube closing the terminals 84 and 86 of the refrigeration switch thus introducing the line current into the refrigeration motor which by its action generates a source of refrigeration supplying the coils 26 located in the vat. The effect is that of immediately and directly cooling the liquid solution in contact therewith.

Should the solution by action of the refrigeration machine become too cool, the liquid in the thermometer bulb 46 will contract so as to withdraw the piston 66 whereupon the spring 77 actuates the lever arrangement connected to the banana-like tube so that the end 72 thereof is lowered. Upon shifting of tube in this direction the slug of mercury 116 will run to the opposite end of the tube and there close contact between the heating coil with terminals 100 and 102. Closure of heating circuit supplying the terminals 110 and 112 of the heating coils 34 attached to the false bottom in the vat causes current to flow through the resistance wire contained in the coils immediately and directly heating the solution in the vat.

As the temperature reaches a balance the banana-like tube 50 will readily shift to a mid-position wherein the slug of mercury 116 will be out of contact with both the heating coil terminals and the refrigeration machine terminals and will remain in such a neutral mid-position so long as the temperature of the liquid in the vat remains at the temperature for which the device is set. A slight change in the temperature of the liquid in either direction will cause immediate response of the control device in the proper direction to heat it or cool it slightly in order to immediately bring the temperature back to the desired mean.

After the body of solution has been used or become dirty or is desired to be replaced by another of a different kind, the unitary structure B can be tilted upwards so as to lift all of the coils out of the vat. This movement not only clears the vat of the control apparatus but by means of operation of the auxiliary line switch 80 cuts the line current supplying both the refrigeration machine and the heating coil so that there is no activity in either one. As long as the unitary structure B is maintained in an elevated position there is therefore no undue waste of energy. When it is desired to remove the apparatus entirely a terminal plug 118 can be pulled thereby disconnecting the line supply.

By means of introducing both heating coils and cooling coils directly into a bath of the chemical solution desired to be controlled and by distributing them over a large area there-within there has been provided an apparatus, governed by suitable controls, which is capable of accurately maintaining any desired temperature in a large bath of solution. The apparatus moreover by being supplied with auxiliary adjustments and controls is convenient to operate and therefore is not subject to misuse by an inexperienced operator who might under ordinary circumstances neglect to disconnect the power lines during periods when the apparatus is not in use.

Some changes may be made in the construction and arrangement of the objects of our device without departing from the real spirit and purpose of the invention and it is our intention to cover by the claims any modified forms of structure or use of mechanical equivalents which may be reasonably included within their scope.

We claim as our invention:

1. A temperature control apparatus for maintaining a selected temperature in a body of liquid comprising a vat for the liquid, a base for supporting the vat, a false bottom for the vat removably positioned therein, an elongated refrigeration coil held against the false bottom in open position so as to cover a large area of the vat, a device for supplying refrigeration connected therewith, an electric heating coil held against the false bottom between the refrigeration coils, an elongated thermal responsive device secured to the false bottom, and a control device connected to the thermal responsive device having electric connections with the refrigeration supplying device and the heating coil to effect operation thereof in response to temperature conditions of the liquid in said vat.

2. A temperature control apparatus for maintaining a selected temperature in a body of liquid comprising a vat for the liquid, a base for supporting the vat, a false perforated bottom for the vat loosely positioned therein, an elongated refrigeration coil secured to the under side of the false bottom in open position so as to cover a maximum area of the vat, a device for supplying refrigeration connected therewith, an electric heating coil fastened to the false bottom between the refrigeration coils, an elongated thermal responsive device secured to the false bottom and a control device connected to the thermal responsive device having electric connections with the refrigeration supplying device and the heating coil to effect operation thereof in response to temperature conditions of the fluid in said vat, there being provided in addition an instrument panel attached to said bottom having a normal position relative to the vat and a normally closed line switch on the instrument panel operable when the panel is moved from normal position to shut off the line circuit supplying said apparatus.

3. A temperature control apparatus for maintaining a selected temperature in a body of liquid comprising a vat for the liquid, a base for supporting the vat, a false perforated bottom for the vat loosely positioned therein, and an instrument panel attached thereto adjacent the vat provided with a movable connection to the base to permit moving the false bottom upward out of the vat, an elongated refrigeration coil secured to the under side of the false bottom in open position so as to cover a maximum area of the vat and a device for supplying refrigeration connected therewith, an electric heating coil fastened to the false bottom between the refrigeration coils, an elongated thermal responsive device secured to the false bottom and a control device on the instrument panel connected to the thermal responsive device having electric connections with the refrigeration supplying device and the heating coil to effect operation thereof in response to temperature conditions of the liquid in said vat, there being provided in addition a line switch on the instrument panel operable when the panel is moved together with the false bottom as said bottom is lifted from the vat to shut off the line circuit supplying said apparatus.

4. In a portable liquid temperature control apparatus adapted to be connected to a source of refrigeration including a vat for liquid, a base for supporting the same adapted to be placed on the top of a work bench or the like, and a source of electric power, the combination of a loose fitting sheet member in the vat hinged to the base having refrigeration coils and heating coils attached thereto supplied with connections respectively to said sources of refrigeration and electric power, a control device connected to said source of power and said source of refrigeration for controlling the source of refrigeration and the heating coil, and a switch movable with said sheet connected between the control device and the source of electric power in a position so as to be closed when the sheet member is lowered into the vat and opened when the sheet member is tilted upward permitting removal of the vat and shutting off all activity therein.

5. In a portable liquid temperature control apparatus adapted to be connected to a source of refrigeration including a vat for liquid, a base for supporting the same adapted to be placed on the top of a work bench or the like and a source of electric power, the combination of a loose fitting perforated sheet member in the vat hinged to the base having refrigeration coils and heating coils attached thereto and supplied with connections respectively to said source of refrigeration and the source of electric power, an instrument panel attached to the sheet member adapted to be tilted therewith to lift the coils from the vat, a control device on the panel connected to said source of refrigeration and the heating coil, a switch on the panel connected between the control device and the source of electric power in a position so as to be closed when the sheet member is lowered into the vat and opened when the sheet member is tilted upward permitting removal of the vat and shutting off all activity therein.

6. In a portable liquid temperature control apparatus adapted to be connected to a source of refrigeration including a vat for liquid, a base for supporting the same adapted to be placed on the top of a work bench or the like, and a source of electric power, the combination of a loose fitting perforated sheet member in the vat hinged to the base having refrigeration coils and heating coils attached thereto and supplied with connections respectively to said sources of refrigeration and electric power, an instrument panel attached to the sheet member adapted to be tilted therewith when the coils are lifted from the vat, a control device on the panel connected to said source of power and the source of refrigeration for controlling said source of refrigeration and the heating coil, a switch on the panel connected between the control device and the source of electric power in a position so as to be closed when the sheet member is lowered into the vat and opened when the sheet member is tilted upward permitting removal of the vat and shutting off all activity therein, and a handle on the sheet member overlying the vat to provide means for manually agitating and mixing of the liquid therein.

7. In an electric fluid temperature control apparatus including a vat for fluid, a base for supporting the same, a loose fitting false bottom in the vat for supporting cooling and heating coils in the vat and an instrument panel tiltable together with the false bottom relative to the base, the combination of a control device on the panel comprising a thermal responsive element located in the vat and connected to the control device, a fluid switch adapted to be actuated by said element having terminals at one end adapted to control a supply of refrigeration, terminals at another end adapted to control electric power supplied to the heating coils and a neutral position for the switch adapted to provide disconnection of both refrigeration and heat during normal operation, and a fluid switch in the main supply circuit secured to the instrument panel and adapted to open the circuit when the false bottom is lifted from the vat.

8. In a liquid temperature control apparatus adapted to be connected to a temperature regulating mechanism including a vat for liquid, a base structure for supporting the same and a source of electric power, the combination of a frame-work in the vat hinged to the base structure having temperature regulating coils supported thereon, connections from said coils to said temperature regulating mechanism, a control device connected to said source of electric power and said temperature regulating mechanism for controlling the temperature of liquid in said vat by operation of said apparatus, and a switch movable with said frame-work connected between the control device and the source of electric power in a position so as to be closed when the frame-work is lowered into the vat and opened when the frame-work is raised upward in order to shut off all activity in the vat and permit removal thereof from the apparatus.

9. A control apparatus for maintaining a selected temperature in a body of fluid comprising a vat for the fluid, a base for supporting the vat, and a framework positionable in the vat provided adjacent one side thereof with a movable connection to said base providing for removal of the framework from the vat, said framework providing when positioned in the vat a clear unobstructed space in the vat above the framework, and an elongated refrigeration coil secured to the framework beneath said space and spread so as to cover a large area of the vat having suitable connections to a source of refrigeration, a heating coil fastened to the framework adjacent the refrigeration coil having suitable connections to a source of heat, said heating coil and said cooling coil being adapted to be lifted by said framework from the vat, and means for operating said refrigeration coil alternatively with said heating coil to maintain the fluid in the vat at a desired temperature.

JAMES F. CERNOHOUZ.
GEORGE E. FRANCK.